United States Patent [19]
Toida et al.

[11] Patent Number: 5,633,544
[45] Date of Patent: May 27, 1997

[54] WHEEL MOTOR

[75] Inventors: Naoya Toida; Yoshiaki Kotani; Yoshihiro Iijima; Junji Okuda; Yoshihisa Hirose, all of Wako, Japan

[73] Assignee: Honda Giken Kogyo Kabushiki Kaisha, Tokyo, Japan

[21] Appl. No.: 299,594

[22] Filed: Sep. 1, 1994

[30] Foreign Application Priority Data

Sep. 28, 1993 [JP] Japan .................................. 5-264199

[51] Int. Cl.$^6$ .................................................. H02K 11/00
[52] U.S. Cl. .................... 310/67 R; 180/65.1; 180/65.5; 180/65.6; 180/65.7; 180/65.8
[58] Field of Search ........................ 180/65.1, 65.5, 180/65.6, 65.7, 65.8; 310/67 R

[56] References Cited

U.S. PATENT DOCUMENTS

| | | |
|---|---|---|
| 2,726,726 | 12/1955 | Le Tourneau . |
| 4,389,586 | 6/1983 | Foster et al. . |
| 5,127,485 | 7/1992 | Wakuta et al. . |
| 5,236,055 | 8/1993 | Legal . |
| 5,246,082 | 9/1993 | Alber . |
| 5,289,890 | 3/1994 | Toyoda et al. . |
| 5,341,892 | 8/1994 | Hirose et al. ............... 180/220 |
| 5,406,154 | 4/1995 | Kawaguchi et al. ............... 310/67 R |

FOREIGN PATENT DOCUMENTS

| | | |
|---|---|---|
| 2-11419 | 1/1990 | Japan . |
| 4-185207 | 7/1992 | Japan . |

*Primary Examiner*—Steven L. Stephan
*Assistant Examiner*—Burton S. Mullins
*Attorney, Agent, or Firm*—Frishauf, Holtz, Goodman, Langer & Chick

[57] ABSTRACT

A wheel motor for a vehicle has an electric motor which is arranged in a central space defined in a wheel, to rotatively drive the wheel. A gear reducer is also arranged in the central space of the wheel. The electric motor includes a housing fixed to the vehicle body, a stator secured to the housing, a rotor rotatably fitted in a central space defined in the stator to generate the rotative driving force during rotation thereof, and an output shaft connected through the gear reducer to the rotor to be rotatively driven thereby, for transmitting the rotating output from the rotor through the gear reducer to the wheel. The output shaft extends through an axial through hole formed in the final stage gear of the gear reducer and an axial through hole formed in the rotor, and is rotatably supported by opposite end portions of the housing. An electric circuit for driving the electric motor is arranged in the central space of the wheel, together with the electric motor.

16 Claims, 7 Drawing Sheets

5,633,544

WHEEL MOTOR

BACKGROUND OF THE INVENTION

1. Field of the Invention

This invention relates to a wheel motor which is adapted for use in vehicles such as electric vehicles, fork lift trucks, and golf carts, and more particularly to a wheel motor which has an electric motor drivingly connected to a wheel through a gear reducer.

2. Prior Art

Wheel motors of this kind, which are equipped with gear reducers, specially require that an electric motor and a reduction gear should be mounted so as not to interfere with the body of a vehicle on which the wheel motor is mounted, when wheels of the vehicle move upward and downward or when they are turning. To meet such a requirement, wheel motors have been proposed, e.g. by Japanese Provisional Patent Publication (Kokai) No. 2-11419 and Japanese Provisional Patent Publication (Kokai) No. 4-185207, which are constructed such that an electric motor and an epicycle reduction gear are arranged in a central space defined by an inner periphery of a wheel, wherein a rotative driving force from the electric motor is transmitted through the reduction gear to the wheel to rotatively drive the same.

However, these conventional wheel motors include a control circuit for driving the electric motor, which is mounted at a frame of the vehicle body on which the wheel motor is mounted, which requires provision of a space for accommodating the control circuit, on the frame side. In addition, it requires arranging many electric lines such as feeder lines and signal lines extending between the vehicle body frame and the wheel motor to connect between the control circuit and the electric motor, which also results in increased lengths of these electric lines.

Moreover, the feeder lines and the signal lines are located at low locations between the wheel and the vehicle body frame and hence can be placed under bad environmental conditions. Therefore, it is very difficult to take measures to protect them against rainwater, mud, etc.

SUMMARY OF THE INVENTION

It is an object of the invention to provide a wheel motor for vehicles, which dispenses with the need of provision of a space for accommodating an electric circuit for driving an electric motor thereof, at a frame of an object, such as a vehicle, on which the wheel motor is to be mounted, to reduce the number of electric lines connecting between the frame and the wheel motor, thereby improving the mountability onto objects and hence widening the range of objects on which the wheel motor can be mounted, even to objects other than vehicles.

It is a further object of the invention to provide a wheel motor, which accommodates therein an electric circuit for driving the electric motor, while maintaining good environmental conditions for the electric circuit.

To attain the above objects, the present invention provides a wheel motor being installable on an object having having a main body, comprising:

a wheel having an inner peripheral portion defining a central space therein;

an electric motor arranged in the central space of the wheel, for generating a rotating output for rotatively driving the wheel;

a gear reducer arranged in the central space of the wheel;

the electric motor including a housing fixed to the main body, a stator secured to the housing and having an inner periphery defining a central space therein; a rotor rotatably fitted in the central space of the stator, for generating the rotating output during rotation thereof, and an output shaft connected through the gear reducer to the rotor to be rotatively driven thereby, the output shaft being drivingly connected to the wheel, for transmitting the rotating output from the rotor through the gear reducer to the wheel, said gear reducer including a final stage gear having an axial through hole formed therein in coaxial relation to an axis of rotation of said final stage gear, and at least one reduction gear means interposed between said rotor and said final stage gear and disposed in eccentricity with said output shaft; and an electric circuit arranged in the central space of the wheel and mounted at the housing of the electric motor so as to be separated from the gear reducer, for driving the electric motor.

Preferably, the gear reducer apparatus includes a including a first space defined within said central space of said wheel and accommodating said gear reducer, and a second space defined between said housing and said wheel so as to be separated from said first space and accommodating the electric circuit.

Alternatively, the wheel motor may be so arranged that the housing defines therein an accommodation space having a shape circular in section and defining a concentric circle about the output shaft, the accommodation space comprising a first space portion accommodating the at least one reduction gear means of the gear reducer, and a second space portion accommodating the electric circuit.

Preferably, the output shaft is rigidly fitted on and extends through the axial through hole of the final stage gear of the gear reducer, the output shaft being rotatably supported by opposite end portions of the housing.

Also preferably, the electric motor comprises a brushless electric motor having a permanent magnet rotor forming the rotor, and sensor means for sensing a position of the permanent magnet rotor, the sensor means being arranged within the central space of the wheel at a side of the rotor closer to the electric circuit.

In a preferred embodiment of the invention, the housing comprises a first casing accommodating the electric motor, a second casing accommodating the gear reducer, and a partition member interposed between the first and second casings and separating them from each other, the output shaft of the electric motor extending through the partition member and being rotatably supported by the first and second casings, the housing including a wall formed integrally on at least one of the second casing and the partition member and defining an accommodation space between the second casing and the partition member, the accommodation space being separated from a space portion of the second casing in which the gear reducer is arranged, the electric circuit including a driving circuit for driving the electric motor, and a control circuit for controlling the driving circuit, at least the control circuit being arranged in the accommodation space.

In the preferred embodiment, preferably, the electric motor comprises a brushless electric motor having a permanent magnet rotor forming the rotor, and sensor means for sensing a position of the permanent magnet rotor, the gear reducer having at least one gear of at least one predetermined reduction stage disposed in eccentricity with the output shaft, and a rotary shaft supporting the at least one gear of the at least one predetermined reduction stage, the partition member having first and second surfaces facing the first and second casings, respectively, the partition member having a mounting portion formed integrally on the first surface thereof, at which the sensor means is mounted in the housing, the partition member having a supporting portion formed integrally on the second surface thereof and supporting the rotary shaft.

More preferably, the wall cooperates with the second casing and the partition member to define therebetween a first space having a horseshoe-shaped configuration as the space, and a second space located inside the first space, the second space accommodating the output shaft and the gear reducer.

The above and other objects, features, and advantages of the invention will be more apparent from the following detailed description taken in conjunction with the accompanying drawings.

DETAILED DESCRIPTION

Figure 1:
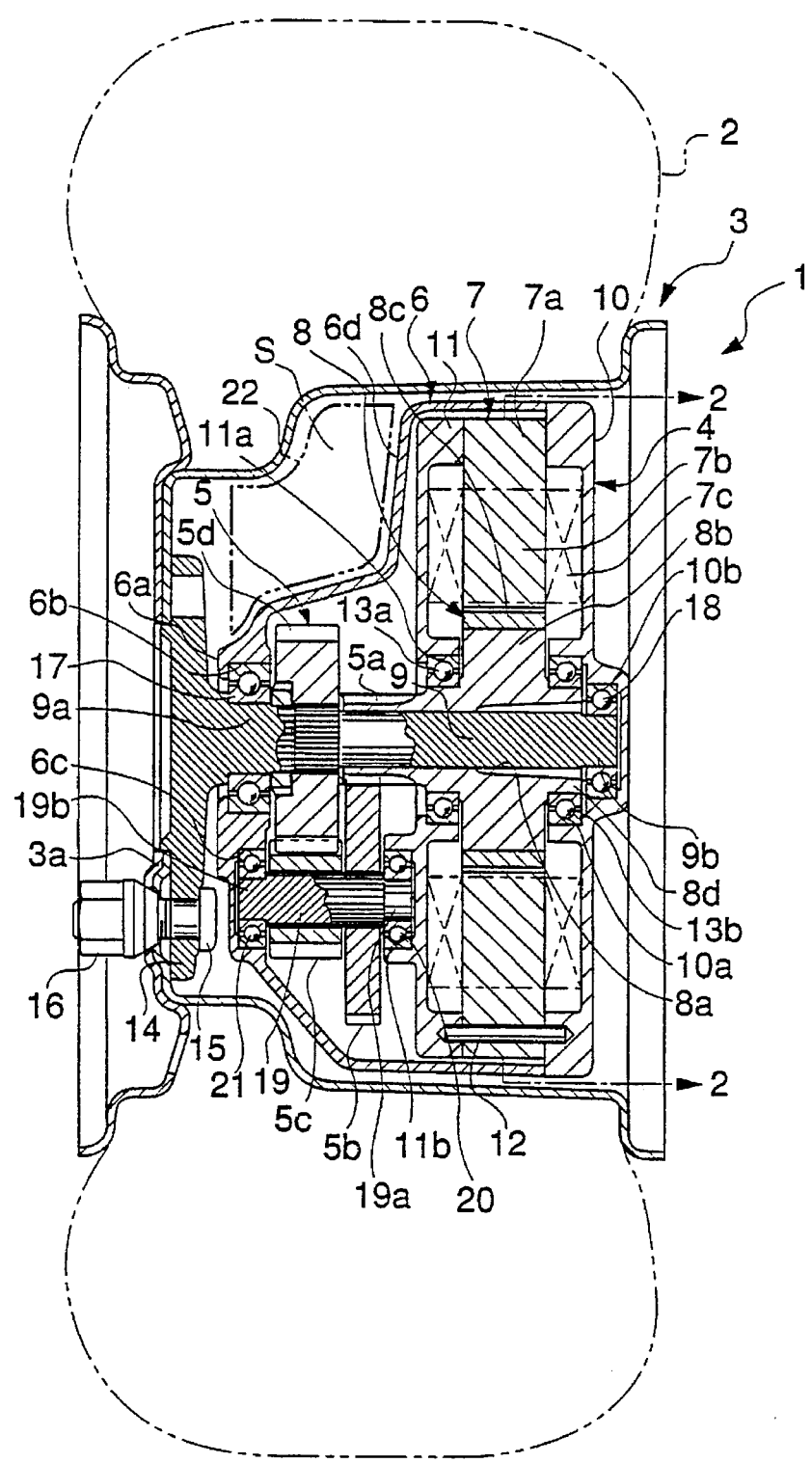
FIG. 1 is a longitudinal vertical sectional view showing the construction of a wheel motor according to a first embodiment of the invention.

The invention will now be described in detail with reference to the drawings showing preferred embodiments thereof. Throughout all the drawings showing the embodiments of the invention, corresponding elements and parts are designated by identical reference numerals.

Figure 2:
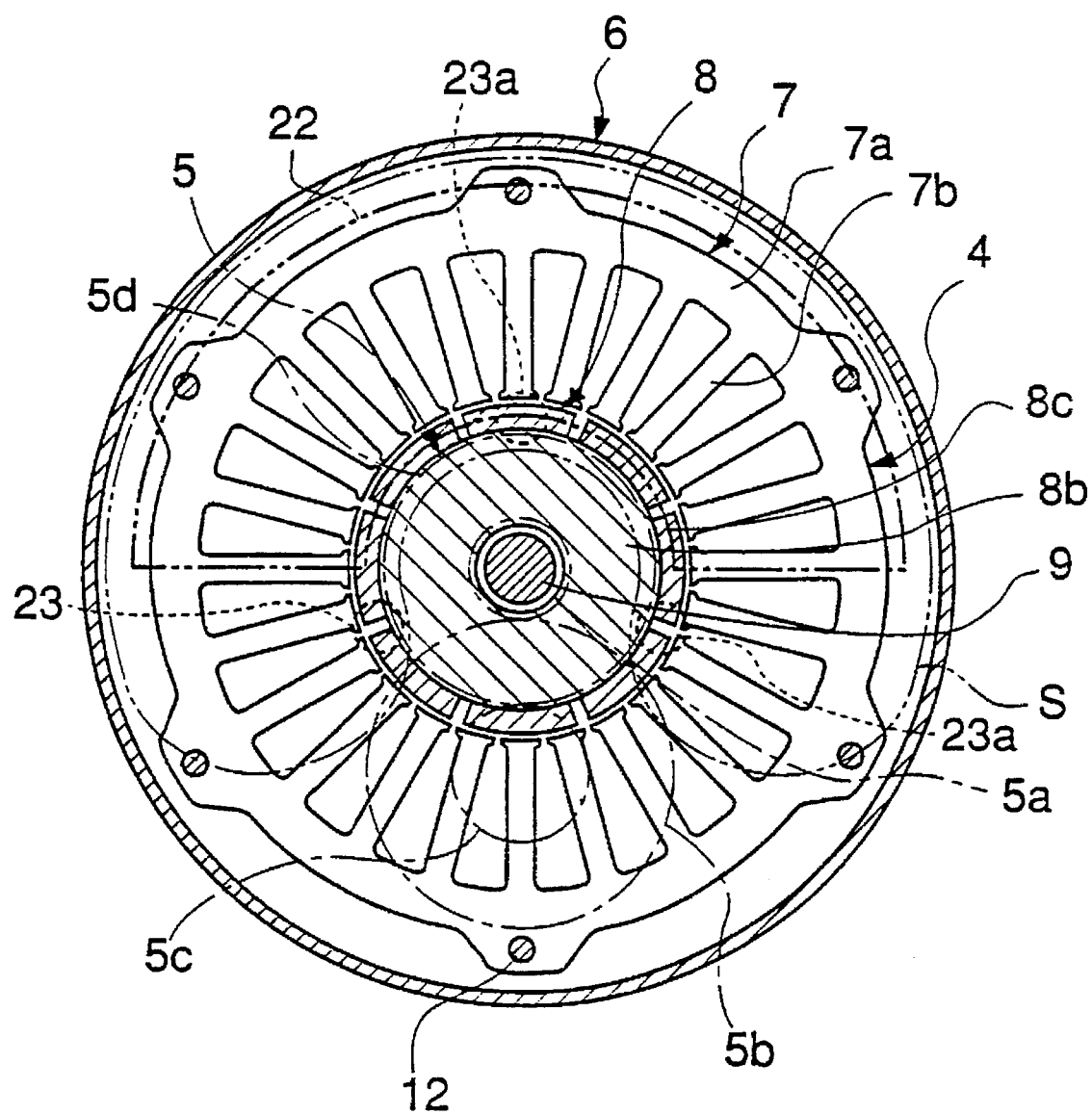
FIG. 2 is a longitudinal transverse sectional view taken along line 2—2 in FIG. 1.

First, a first embodiment of the invention will be described with reference to FIGS. 1 and 2. FIG. 1 shows the construction of a wheel motor according to the first embodiment. In the figure, reference numeral 1 designates a wheel motor, which includes an electric motor 4, and a gear reducer 5, which are arranged in a central space defined in a wheel 3 with a tire 2 by an inner periphery thereof. The electric motor 4 is drivingly connected through the gear reducer 5 to the wheel 3, whereby the wheel 3 is rotatively driven by a rotative driving force generated by the electric motor 4.

The electric motor 4 is comprised of a stator 7 fixed to a housing 6 arranged in the central space of the wheel 3, a rotor 8 rotatably arranged in a central space defined in the stator 7 by an inner periphery thereof, and an output shaft 9 disposed to transmit a rotating output (rotative driving force) from the rotor 8 through the gear reducer 5 to the wheel 3.

The housing 6 has a generally cap-shaped configuration and has a bottom 6a thereof formed with an axial through hole 6b. The housing 6 is fixed to a vehicle body, not shown, by a suitable fixing means.

The stator 7 has a stator main body 7a formed of a multiplicity of magnetic sheets each in the form of an annulus, which are stacked one upon another and formed integrally with a plurality of magnetic pole-forming projections 7b radially inwardly extending from an outer peripheral portion thereof at circumferentially equal intervals, and field coils 7c wound on the respective magnetic poles 7c. The stator 7 is arranged in a portion of the housing 6 remote from the bottom 6a thereof, in a manner being held at its opposite end surfaces between outer and inner covering members 10 and 11. The covering members 10, 11 are secured to marginal portions of the housing 6 remote from the bottom 6a thereof, and the stator 7 is secured to the covering members by means of fixing pins 12 at a plurality of points of its outer peripheral portion.

The rotor 8 has a rotor main body (enlarged diameter portion) 8b having an axial through hole 8a formed therein in coaxial relation to the axis of rotation of the rotor 8 and axially extending through the whole length of the rotor 8, a plurality of permanent magnet members 8c secured to an outer peripheral portion of the main body 8b at circumferentially equal intervals, and thinned portions (reduced diameter portions) 8d and 8e formed integrally with the main body 8b at opposite ends thereof. The main body 8b of the rotor 8 is rotatably fitted in the central space of the stator 7, in facing relation thereto. The thinned portions 8d, 8e are rotatably supported by the covering members 10, 11 by means of bearings 13a and 13b formed by ball bearings or the like, fitted, respectively, in central holes 10a and 11a defined by stepped shoulders of the covering members 10, 11. Thus, the outer peripheral portion of the rotor 8 is rotatably supported at its opposite ends by the housing 6 via the covering members 10, 11.

In this way, the stator 7 and the rotor 8 form the electric motor 4 thus fixed to the housing 6 in a manner being held between the covering members 10, 11.

The output shaft 9 has a fitting flange 14 formed integrally with an end portion 9a thereof, which is secured to a hub 3a of the wheel 3 by means of bolts 15 and nuts 16. The output shaft 9 is rotatably supported by the housing 6 such that the end portion 9a thereof is rotatably fitted in the axial through hole 6b of the housing 6 via a bearing 17 formed by a ball bearing or the like, and the other end portion 9b in a central recess 10b formed in the outer covering member 10 via a bearing 18 formed by a ball bearing or the like, respectively. The output shaft 9 extends through the axial through hole 8a of the rotor 8 in a manner being out of contact with the inner wall of the hole 8a.

The gear reducer 5 is a double reduction type which is comprised of a plurality of (four in the illustrated embodiment) gears 5a, 5b, 5c and 5d. The first gear 5a is formed integrally on a tip of the thinned portion 8e at one end portion (left end portion as viewed in FIG. 1) of the rotor 8, in concentricity with the rotor 8. The second and third gears 5b, 5c are both rigidly fitted on a common rotary shaft 19, for rotation in unison with each other. The second gear 5b is in mesh with the first gear 5a. The rotary shaft 19 is located below the output shaft 9 in eccentricity therewith. The rotary shaft 19 is rotatably supported by the inner covering member 11 and the housing 6 such that an end portion 19a thereof is rotatably fitted in a recess 11b formed in the inner covering member 11 via a bearing 20 formed by a ball bearing or the like, and the other end portion 19b in a recess 6c formed in the housing 6 by a bearing 21 formed by a ball bearing or the like, respectively. The fourth or final stage gear 5d has an axial through hole 5d' formed therein in coaxial relation to the axis rotation of the gear 5d and rigidly fitted on the output shaft 9, which extends through the axial through hole 5d', for rotation in unison therewith. The fourth gear 5d is mesh with the third gear 5c. The housing 6 accommodates the first to fourth gears 5a–5d in a portion thereof which expands radially outward in a cap-shaped fashion. The housing 6 cooperates with the hub 3a of the wheel 3 to define therebetween a space S at an upper portion thereof, which has a generally U-shaped profile as indicated by a two-dot chain line in FIG. 2, and in which an electric circuit (including a driving circuit and a control circuit) 22 for driving the electric motor 4. The space S is remote from a lower space in which the first to fourth gears 5a–5d are arranged.

The electric motor 4 is a brushless electric motor having a permanent magnet rotor as the rotor 8, a three-phase stator winding (field coils 7c), and a position sensor 23 for sensing the position of the rotor 8. The position sensor 23 is comprised of a plurality of (three in the illustrated embodiment) magnetic pole sensor elements 23a mounted on the inner covering member 11 at circumferentially equal intervals of a predetermined angle (e.g. 120°). The magnetic pole sensor elements 23a are located within the central space of the wheel 3 at a side of the rotor 8 closer to the electric circuit 22.

The magnetic pole sensor elements 23a may be typically formed by magnetic sensor elements such as a Hall element. But, the position sensor 46 may be any known sensor means including a photo sensor.

With the above stated arrangement, when the rotor 8 is rotated due to the action of a rotating magnetic field formed by the stator 7, the first gear 5a integral with the rotor 8 rotates together with the rotor 8, i.e. at the same rotational speed as the latter. A rotating output from the first gear 5a is transmitted through the second and third gears 5b, 5c while being reduced in speed, to the fourth gear 5d, whereby the output shaft 9 and the wheel 3 are rotated at the same rotational speed as the fourth gear 5d, i.e. at a reduced rotational speed, and in the same rotational direction as the rotor 8. For example, when the rotor 8 rotates in the positive direction at 750 rpm, the output shaft 9 and the wheel 3 rotate in the positive direction at a speed of 150 rpm as a result of speed reduction by the gear reducer 5.

Next, the operation of the wheel motor constructed as above will be described. When the stator 7 of the electric motor 4 is supplied with electricity, the rotor 8 rotates at a rotational speed of 750 rpm, for example. The rotating output from the rotor 8 has its speed reduced by the first to fourth gears 5a–5d of the gear reducer 5, and then transmitted to the output shaft 9, whereby the wheel 3 rotates together with the output shaft 9, at a rotational speed of 150 rpm, for example.

According to the present embodiment, the output shaft 9 of the electric motor 4 is rotatably supported by the opposite end portions of the housing 6, while the output shaft 9 extends through the axial through hole 5d' of the fourth gear 5d as the final stage gear of the gear reducer 5 and the axial through hole 8a of the rotor 8. As a result, the construction can be simple, notwithstanding the arrangement of the electric motor 4 and the gear reducer 5 in the central space of the wheel 3. Besides, the construction facilitates assemblage of the wheel motor such that the component parts of the gear reducer 5, the inner covering member 11, the component parts of the electric motor 4, and the outer covering member 10 can be successively fitted into respective places with reference to the output shaft 9. Further, since the output shaft 9 is substantially supported by opposite end portions of the entire wheel motor, the supporting span of the output shaft 9 can be set to a large value, thereby obtaining sufficient strength for supporting the wheel 3 including the tire 2 so as to prevent them from falling sideways. Moreover, since the electric circuit 22 for driving the electric motor 4 is arranged in the space S defined between the housing 6 and the wheel 3, which is remote from the space in which the first to fourth gears 5a–5d are arranged, a space for accommodation of the electric circuit 22 no more needs to be provided in the frame of the vehicle body on which the wheel motor 1 is mounted, whereby the electrical circuit 22 can be protected from rainwater, mud, etc. by the wheel 3. Moreover, the number of electric power lines to be wired between the vehicle body frame and the wheel motor 1 can be reduced (e.g. if the electric motor 4 is a three-phase type, the electric power lines can be reduced in number from 3 to 2; and if the motor is grounded to the vehicle body, only one electric power line is required), to thereby reduce the limitation on mounting the wheel motor according to the invention onto bodies of vehicles, in other words, to facilitate the installability of the wheel motor onto vehicle bodies, and even make it possible to use the wheel motor in other moving objects than vehicles, i.e. to enhance the versatility. Further, since the electric motor 4 is formed by a brushless type with a permanent magnet rotor 8, and the position sensor 23 is arranged on the electric circuit 22 side, in other words, the position sensor 23 is arranged in the vicinity of the electric circuit 22, the wiring operation can be simplified, while shorter sensor signal lines can be used between the electric circuit and the position sensor, thus preventing noise from being picked up by the sensor signal lines.

Figure 3:
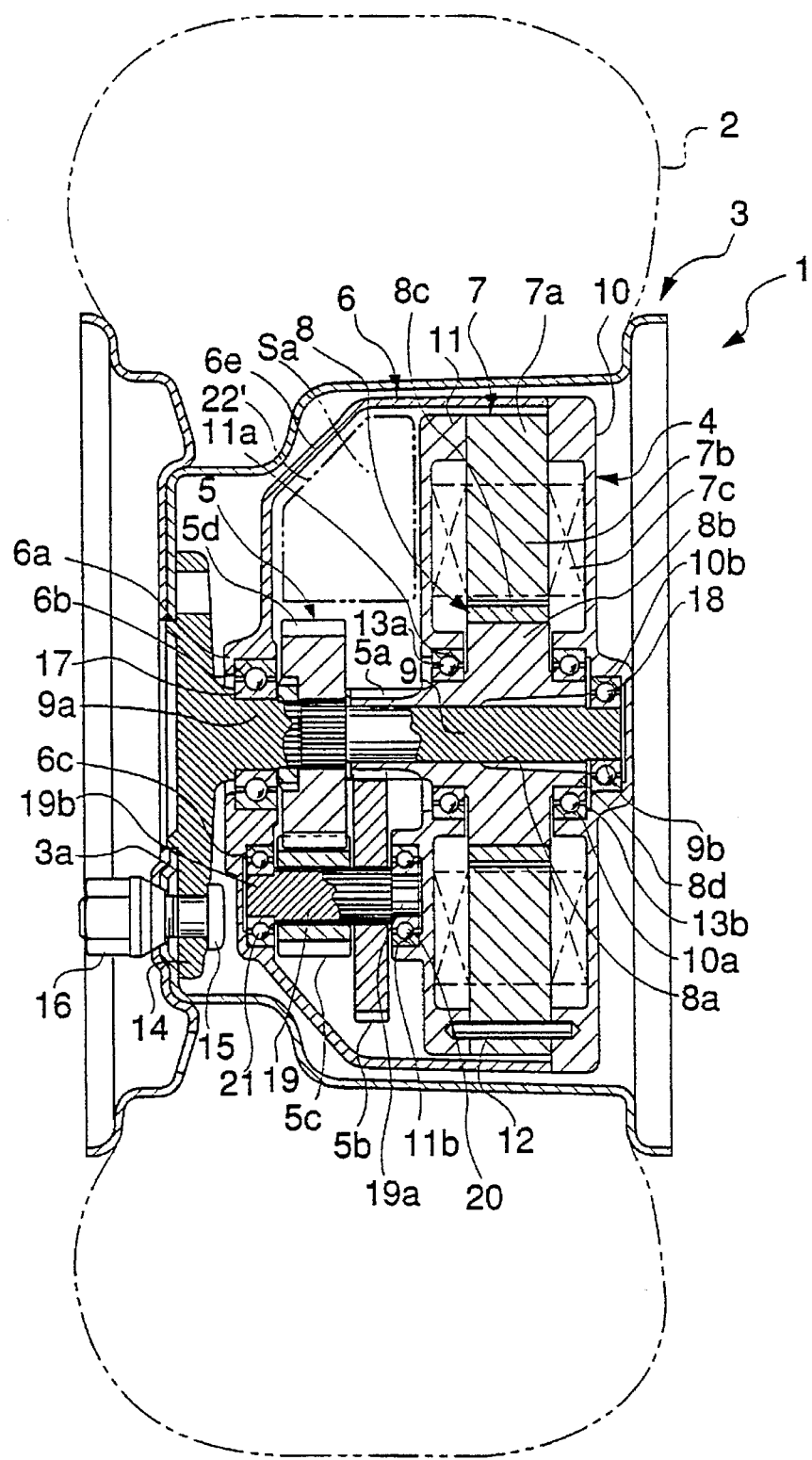
FIG. 3 is a longitudinal vertical sectional view showing the construction of a wheel motor according to a second embodiment of the invention.

A second embodiment of the invention will now be described with reference to FIG. 3, which shows the construction of a wheel motor according to the second embodiment. The wheel motor 1a according to this embodiment is distinguished from the first embodiment described above in that a housing 6 of this embodiment has a different sectional profile from that of the first embodiment, and a space Sa for accommodating the electric circuit 22 is located at a different location from that of the first embodiment. More specifically, in the first embodiment, as shown in FIG. 1, the housing 6 has a nearly vertical stepped shoulder 6d forming part of a peripheral vertical wall thereof at an axially intermediate portion thereof such that a peripheral wall portion of the housing 6 remote from the bottom 6a with respect to the stepped shoulder 6d has a larger diameter than one close to the bottom 6a. In other words, in the first embodiment, the housing 6 has an expanded portion at part of the whole circumference in order to accommodate the gear reducer 5 therein, while the space S for accommodating the electric circuit 22 is defined by a portion of the peripheral wall of the housing 6 which is not expanded, and the hub 3a of the wheel. In contrast, the housing 6 according to the present embodiment, as shown in FIG. 3, has a tapered wall portion 6e which progressively decreases in diameter toward the bottom 6a, lying between an axially intermediate peripheral wall portion thereof and the bottom 6a. In other words, an axial half portion of the housing 6 in which the reducer gear 5 is accommodated is expanded over the whole circumference into a shape of a concentric circle about the output shaft 9, such that the space Sa corresponding to the space S in FIG. 1, for accommodation of the electric circuit 22, is defined between a portion of the housing 6 in which the gear reducer 5 is not accommodated and the inner covering member 11.

The present embodiment is substantially identical in construction, operation, and effect with the first embodiment described hereinbefore, except for those described above, further description of which is therefore omitted.

Figure 4:
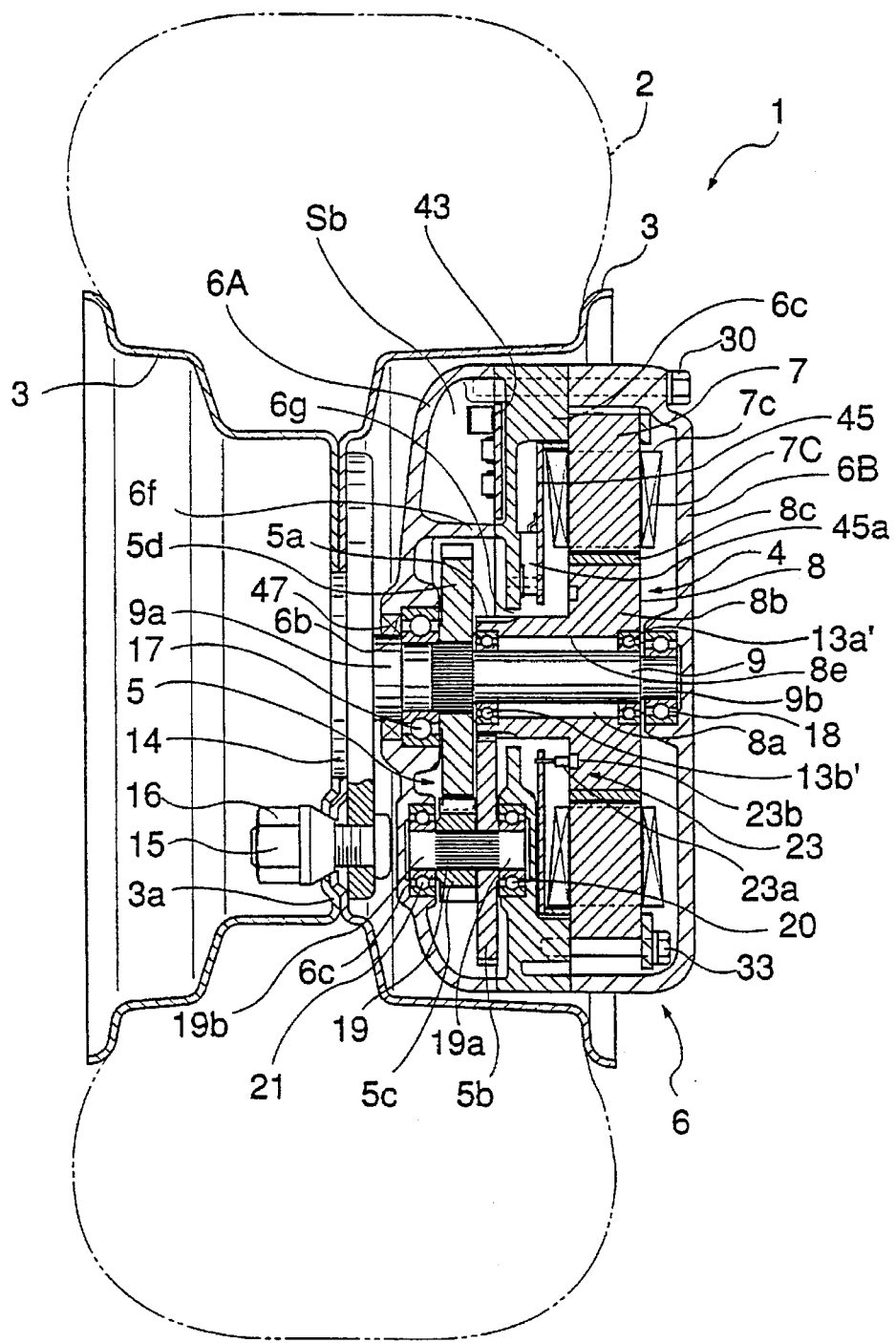
FIG. 4 is a longitudinal vertical sectional view showing the construction of a wheel motor according to a third embodiment of the invention.

A third embodiment of the invention will be described with reference to FIGS. 4–7. FIG. 4 shows the construction of a wheel motor according to the third embodiment. The housing 6 of the wheel motor 1 according to this embodiment is comprised of an outer casing 6A, an inner casing 6B, and a partition plate member 6C. The inner casing 6B and the partition plate member 6C are fastened together by means of bolts 30, and the outer casing 6A and the partition plate member 6C are fastened together by means of bolts 31 shown in FIG. 6. The outer and inner casings 6A, 6B and the partition plate member 6C are formed of die castings.

Figure 5:
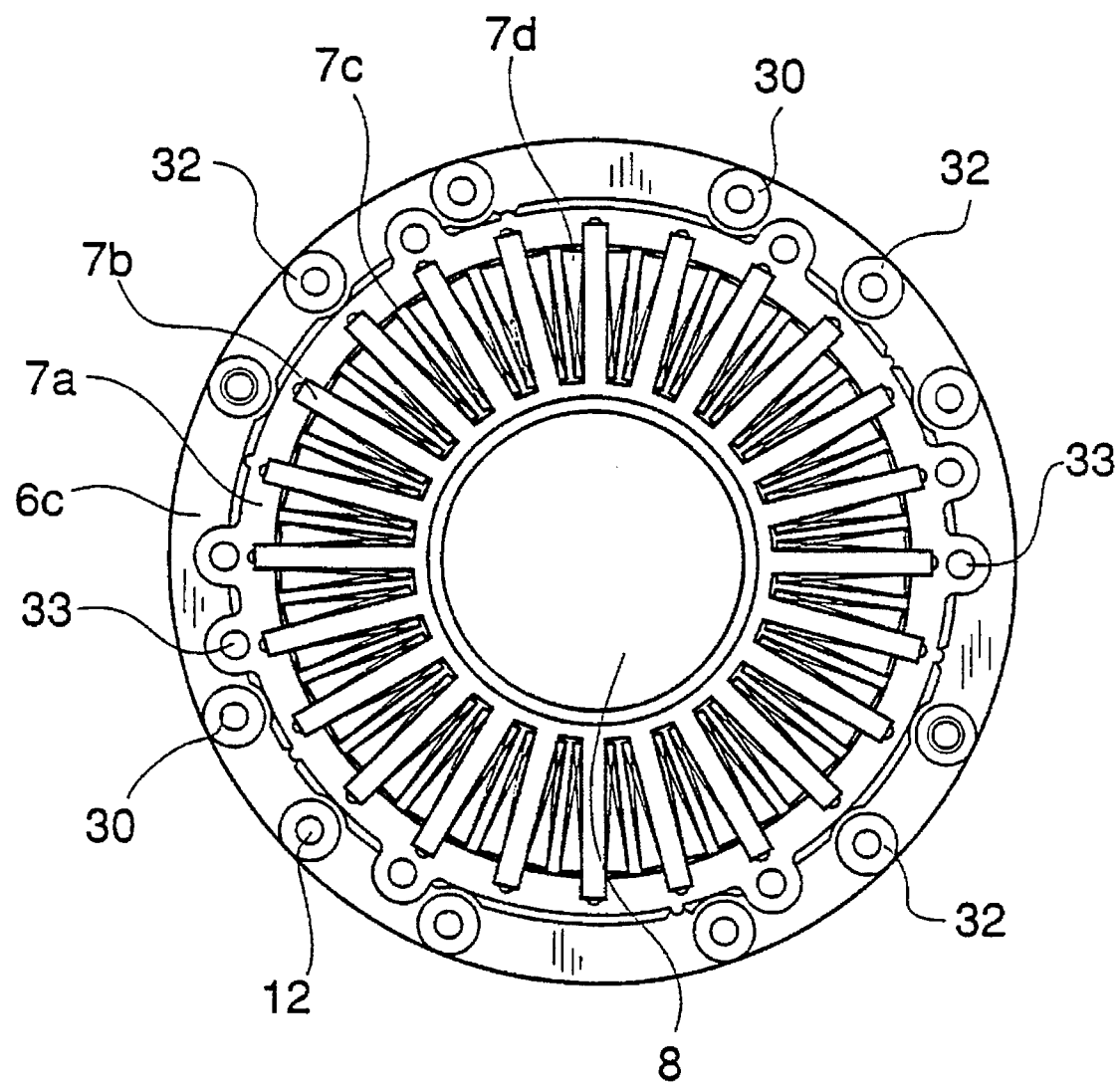
FIG. 5 is a transverse sectional view showing a section in FIG. 4 in which an electric motor is mounted.
Figure 6:
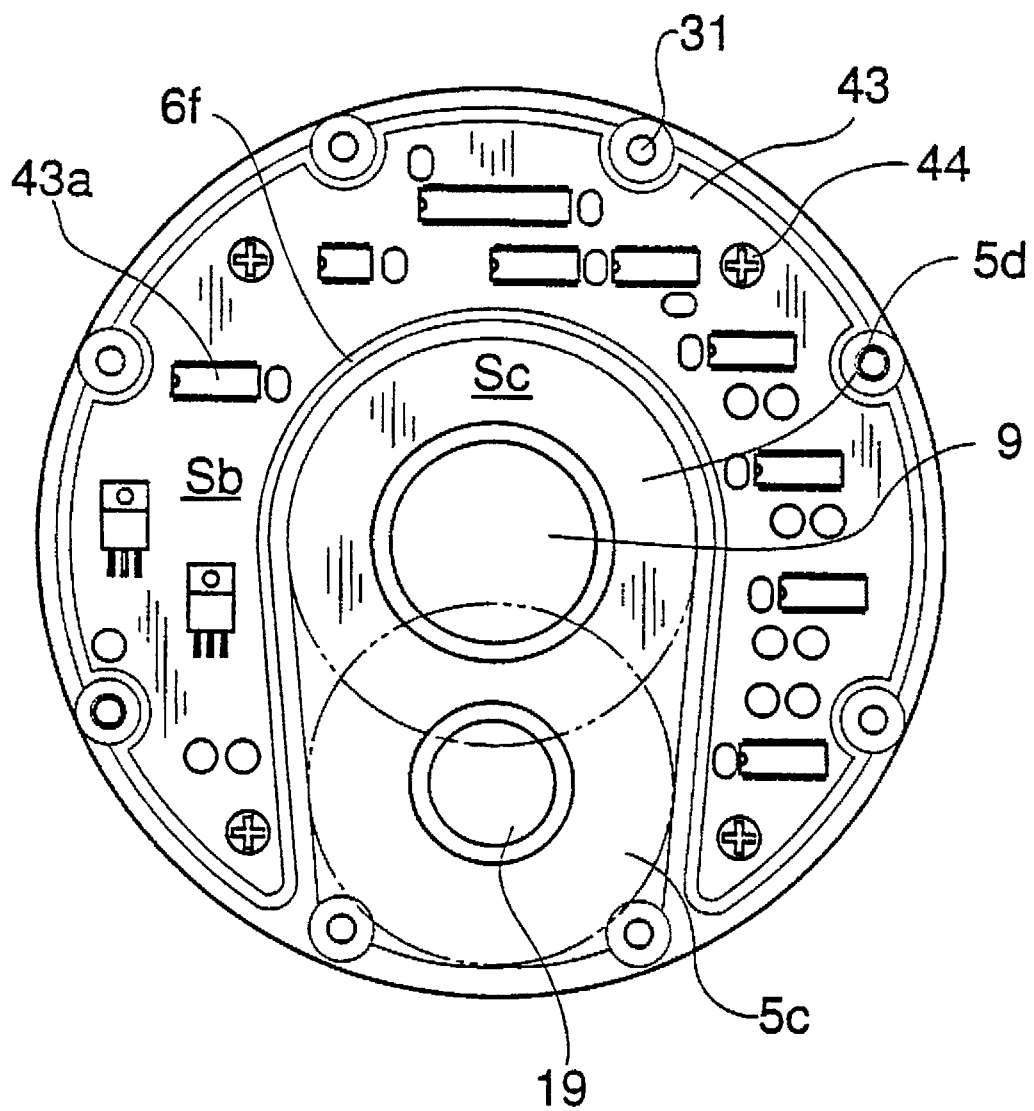
FIG. 6 is a transverse sectional view showing a section in FIG. 4 in which a first circuit board is mounted.

The outer casing 6A has a central portion thereof formed with an axial through hole 6b, and an integral partition wall 6f formed integrally on an inner side surface thereof (i.e. inside the housing 6), which defines a space Sb having a horseshoe-shaped configuration (FIG. 6). The inner casing 6 is fixed to the vehicle body, not shown, by means of bolts 32 shown in FIG. 5.

The stator 7 of the electric motor 4 is mounted within the inner casing 6B. The stator 7 has magnetic poles 7b of a main body 7a thereof on which the three-phase field coils 7c are wound via coil bobbins 7d, as shown in FIG. 5. The stator 7 is secured at a plurality of outer peripheral portions thereof to the partition plate member 6C by means of bolts 33.

The rotor 8 has a rotor main body (increased diameter portion) 8b, and a thinned portion (reduced diameter portion) 8e axially extending integrally from one end of the main body 8b and having a larger axial size than the latter. A tip of the thinned portion 8e is formed integrally with the first gear 5a of the gear reducer 5, similarly to the previous embodiments. The main body 8b, which is shorter in axial size than the thinned portion 8e, is rotatably fitted in a central space defined in the stator 7 by an inner periphery thereof, in facing relation thereto. The rotor 8 is rotatably supported on the output shaft 9 by means of bearings 13a' and 13b' formed by ball bearings or the like, which are force-fitted between the output shaft 9 and opposite ends of inner peripheral portions of the rotor 8, for rotation about and relative to the output shaft 9.

One end portion 9a of the output shaft 9 is rotatably supported in the axial through hole 6b of the outer casing 6A via a bearing 17 formed by a ball bearing or the like, and the other end portion 9b of the output shaft 9 in a central recess formed in the inner casing 6B via a bearing 18 formed by a ball bearing or the like, respectively. Thus, also in this embodiment, the output shaft 9 extends through the axial through hole 8a of the rotor 8 in a fashion being out of contact therewith. A seal member 47 is interposed between the axial through hole 6b of the outer casing 6A and the output shaft 9 to seal them again the outside. In this embodiment, the electric motor 4 mainly formed of the stator 7 and the rotor 8 has a shorter axial length as compared with the previous embodiments, presenting a generally flat configuration, which realizes a shorter axial size of the whole wheel motor 1, i.e. a shorter size thereof along the output shaft 9.

The rotary shaft 19 of the gear reducer 5 has an end portion 19a thereof rotatably supported in a recess formed in the partition plate member 6C via a bearing 20 formed by a ball bearing or the like, and the other end portion 19b in a recess formed in the outer casing 6A via a bearing 21 formed by a ball bearing or the like, respectively.

Figure 7:
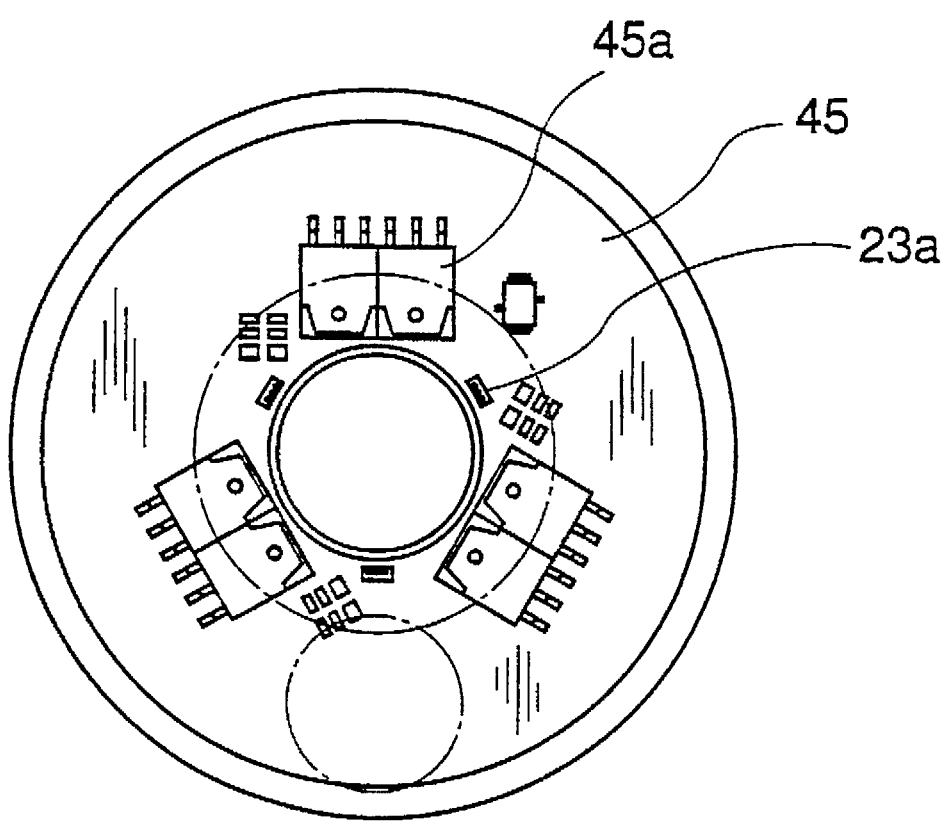
FIG. 7 is a transverse sectional view showing a section in FIG. 4 in which a second circuit board is mounted.

The partition plate member 6C has a central portion thereof formed with a through hole 6g through which the thinned portion 8e of the rotor 8 extends in a fashion being out of contact with the inner wall of the through hole 6g. A first circuit board 43, which forms a control circuit for driving the electric motor 4, is mounted in the space Sb defined by the partition plate member 6C and the horseshoe-shaped partition wall 6f of the outer casing 6A and secured to the partition plate member 6C by means of set screws 44, as best shown in FIG. 6. A second circuit board 45 in the form of a doughnut, which forms a driving circuit driven by a signal from the control circuit, for supplying driving current to the electric motor 4, is mounted in a space defined by the reverse side surface of the partition plate member 6C and secured to the plate member 6C by suitable means, not shown, as best shown in FIG. 7. Since the space Sb for accommodating the control circuit thus has a horseshoe-shaped configuration, it provides practically a large spatial size for accommodating various circuit component parts of the control circuit, in a limited space within the housing 6. The output shaft 9 of the electric motor 4 and the gear 5c, rotary shaft 19, etc. of the gear reducer 5 are accommodated in a space Sc defined inside the space Sb, by the horseshoe-shaped partition wall 6f, as shown in FIG. 6.

The first circuit board 43, which has a horseshoe-shaped surface configuration, has mounted thereon various circuit component parts 43a forming the control circuit, while the second circuit board 45 has mounted thereon circuit component parts forming the driving circuit for supplying driving current to the field coils 7c, such as a power transistor (power MOSFET) 45a. Insulation film sheets, not shown, are interposed between the partition plate member 6C and the first and second circuit boards 43, 45.

As shown in FIGS. 4 and 7, the position sensor 23 is formed of a ring-like magnet member 23b embedded in an end surface of the rotor 8, and a plurality of magnetic pole sensor elements 23a mounted on an opposed surface of the second circuit board 45 at circumferentially equal intervals of a predetermined angle (e.g. 120°) at such locations as they can encounter the ring-like magnet member 23b.

Next, the manner of assembling the wheel motor 1 of the present embodiment constructed as above will be described. First, the output shaft 9 is mounted into the outer casing 6A which previously has mounted thereon the bearings 17, 21 and the seal member 47. Then, the second to fourth gears 5b, 5c, 5d of the gear reducer 5 are mounted into the outer casing 6A.

Then, the first and second circuit boards 43, 45, and the stator 7 are mounted onto the partition plate member 6C, followed by wiring therebetween. Then, the partition plate member 6C is fixed to the outer casing 6A by means of the bolts 31. The rotor 8 with the bearings 13a', 13b' previously force fitted therein is then inserted into the stator 7. Finally, the inner casing 6B with the bearing 18 previously fitted therein is mounted onto the partition plate member 6C by means of the bolts 30.

According to the third embodiment described above, similarly to the previous embodiments, it is possible to assemble the wheel motor by fitting into respective places the outer casing 6A, the component parts of the gear reducer 5, the partition plate member 6C, the component parts of the electric motor 4, the outer casing 6A, and the inner casing 6B, in the order mentioned, with reference to the output shaft 9, thus facilitating the assemblage. Further, also in this embodiment, the supporting span of the output shaft 9 can be set to a large value, in spite of the shorter axial size of the whole wheel motor 1, thereby obtaining sufficient strength for supporting the wheel 3 with the tire 2 so as to prevent them from falling sideways.

Particularly, according to this embodiment, the control circuit for driving the electric motor 4 is arranged in the space Sb defined by the horseshoe-shaped partition wall 6f, whereby the space for mounting the control circuit at a frame of a vehicle body on which the wheel motor 1 is to be mounted is no more required. Besides, the control circuit can be protected against rainwater, mud or the like, as well as against lubricating oil, powder produced due to wear of the gears, etc. splashed by rotation of the output shaft 9, the gear reducer 5, etc. Further, it can be protected against heat radiated from the electric motor 4. Moreover, the number of electric power lines to be wired between the vehicle body frame and the wheel motor 1 can be reduced (e.g. if the electric motor 4 is a three-phase type, the power electric lines can be reduced in number from 3 to 2; and if the motor is grounded to the vehicle body, only one electric power line is required), to thereby reduce the limitation on mounting the wheel motor according to the invention onto bodies of vehicles, in other words, facilitate the installability of the wheel motor onto vehicle bodies, and even make it possible to use the wheel motor in other moving objects than vehicles, i.e. enhance the versatility. Further, since the electric motor 4 is formed by a brushless type with a permanent magnet rotor 8, and the position sensor 23 is arranged on the rotor 8 side, in other words, the position sensor 23 is arranged in the vicinity of the rotor 8 while it is separated from the gear reducer 5, the position sensor 46 is placed in a good environmental condition, whereby it is protected from rainwater, wear powder, etc. similarly to the case of the control circuit, while shorter sensor signal lines can be used between the control circuit and the position sensor, thus preventing noise from being picked up by the sensor signal lines.

Still further, according to the present embodiment, the rotor 8 is rotatably supported on the output shaft 9 via the bearings 13a', 13b', which makes it possible to use bearings with reduced diameters as the bearings 13a', 13b'. Particularly, the employment of a double reduction gear as the gear reducer 5 is advantageous to this arrangement in that the rotor 8 and the output shaft 9 rotate in the same direction, and hence the relative rotational speed difference between them is small, which leads to a reduced amount of abrasion.

The present embodiment is substantially identical in construction, operation, and effect with the first embodiment described before, except for those described above, further description of which is therefore omitted.

The present invention is not limited to the above described embodiments, but any modifications and variations thereto are possible within the scope of the appended claims. For example, in the third embodiment, the partition wall 6f may be formed integrally with the partition plate member 6C, instead of being formed integrally with the outer casing 6A. Further alternatively, halves of the partition wall 6f may be formed integrally with the outer casing 6A and the partition plate member 6C, respectively, so as to be joined together when the wheel motor is assembled.

What is claimed is:

1. A wheel motor being installable on an object having a main body, comprising:
   a wheel having an inner peripheral portion defining a central space therein;
   an electric motor arranged in said central space of said wheel, for generating a rotating output for rotatively driving said wheel;
   a gear reducer arranged in said central space of said wheel;
   said electric motor including a housing fixed to said main body, a stator secured to said housing and having an inner periphery defining a central space therein; a rotor rotatably fitted in said central-space of said stator, for generating said rotating output during rotation thereof, and an output shaft connected through said gear reducer to said rotor to be rotatively driven thereby, said output shaft being drivingly connected to said wheel, for transmitting said rotating output from said rotor through said gear reducer to said wheel, said gear reducer including a final stage gear having an axial through hole formed therein in coaxial relation to an axis of rotation of said final stage gear, and at least one reduction gear means interposed between said rotor and said final stage gear and disposed in eccentricity with said output shaft; and
   an electric circuit arranged in said central space of said wheel and mounted at said housing of said electric motor so as to be separated from said gear reducer, for driving electric motor.

2. A wheel motor as claimed in claim 1, including a first space defined within said central space of said wheel and accommodating said gear reducer, and a second space defined between said housing and said wheel so as to be separated from said first space and accommodating said electric circuit.

3. A wheel motor as claimed in claim 1, wherein, said housing defines therein an accommodation space having a space circular in section and concentric circle, about said output shaft, said accommodation space comprising a first space portion accommodating said at least one reduction gear means of said gear reducer, and a second space portion accommodating said electric circuit.

4. A wheel motor as claimed in claim 2, wherein said housing has opposite end portions, said output shaft being rigidly fitted in and extending through said axial through hole of said final stage gear of said gear reducer, said output shaft being rotatably supported by said opposite end portions of said housing.

5. A wheel motor as claimed in claim 1, wherein said electric motor comprises a brushless electric motor having a permanent magnet rotor forming said rotor, and sensor means for sensing a position of said permanent magnet rotor, said sensor means being arranged within said central space of said wheel at a side of said rotor closer to said electric circuit.

6. A wheel motor as claimed in claim 1, wherein said housing comprises a first casing accommodating said electric motor, a second casing accommodating said gear reducer, and a partition member interposed between said first and second casings and separating them from each other,
   said output shaft of said electric motor extending through said partition member and being rotatably supported by said first and second casings,
   said housing including a wall formed integrally on at least one of said second casing and said partition member and defining an accommodation space between said second casing and said partition member, said accommodation space being separated from a space portion of said second casing in which said gear reducer is arranged, and
   said electric circuit including a driving circuit for driving said electric motor, and a control circuit for controlling said driving circuit, at least said control circuit being arranged in said accommodation space.

7. A wheel motor as claimed in claim 6, wherein said electric motor comprises a brushless electric motor having a permanent magnet rotor forming said rotor, and sensor means for sensing a position of said magnet rotor, said gear reducer having at least one gear of at least one predetermined reduction stage disposed in eccentricity with said output shaft, and a rotary shaft supporting said at least one gear of said at least one predetermined reduction stage, said partition member having first and second surfaces facing said first and second casings, respectively, said partition member having a mounting portion formed integrally on said first surface thereof, at which said sensor means is mounted in said housing, said partition member having a supporting portion formed integrally on said second surface thereof and supporting said rotary shaft.

8. A wheel motor as claimed in claim 6, wherein said wall cooperates with said second casing and said partition member to define therebetween a first space having a horseshoe-shaped configuration as said space, and a second space located inside said first space, said second space accommodating said output shaft and said gear reducer.

9. A wheel motor being installable on an object having having a main body, comprising:

a wheel having an inner peripheral portion defining a central space therein;

an electric motor arranged in said central space of said wheel, for generating a rotating output for rotatively driving said wheel, said electric motor having an output shaft;

a gear reducer arranged in said central space of said wheel;

said output shaft being connected to said gear reducer and said wheel, for transmitting said rotating output from said electric motor transmitted through said gear reducer, to said wheel, said housing comprising a first casing accommodating said electric motor, a second casing accommodating said gear reducer, and a partition member interposed between said first and second casings and separating them from each other, said output shaft of said electric motor extending through said partition member and being rotatably supported by said first and second casings said housing including a wall formed integrally on at least one of said second casing and said partition member and defining an accommodation space between said second casing and said partition member, said accommodation space being separated from a space portion of said second casing in which said gear reducer is arranged, said electric circuit including a driving circuit for driving said electric motor, and a control circuit for controlling said driving circuit, at least said control circuit being arranged in said accommodation space.

10. A wheel motor as claimed in claim 9, wherein said electric motor comprises a brushless electric motor having a permanent magnet rotor forming said rotor, and sensor means for sensing a position of said permanent magnet rotor, said gear reducer having at least one gear of at least one predetermined reduction stage disposed in eccentricity with said output shaft, and a rotary shaft supporting said at least one gear of said at least one predetermined reduction stage, said partition member having first and second surfaces facing said first and second casings, respectively, said partition member having a mounting portion formed integrally on said first surface thereof, at which said sensor means is mounted in said housing, said partition member having a supporting portion formed integrally on said second surface thereof and supporting said rotary shaft.

11. A wheel motor as claimed in claim 9, wherein said wall cooperates with said second casing and said partition member to define therebetween a first space having a horseshoe-shaped configuration as said space, and a second space located inside said first space, said second space accommodating said output shaft and said gear reducer.

12. A wheel motor as claimed in claim 3, wherein said housing has opposite end portions, said output shaft being rigidly fitted in and extending through said axial through hole of said final stage gear of said gear reducer, said output shaft being rotatably supported by said opposite end portions of said housing.

13. A wheel motor as claimed in claim 2, wherein said electric motor comprises a brushless electric motor having a permanent magnet rotor forming said rotor, and sensor means for sensing a position of said permanent magnet rotor, said sensor means being arranged within said central space of said wheel at a side of said rotor closer to said electric circuit.

14. A wheel motor as claimed in claim 3, wherein said electric motor comprises a brushless electric motor having a permanent magnet rotor forming said rotor, and sensor means for sensing a position of said permanent magnet rotor, said sensor means being arranged within said central space of said wheel at a side of said rotor closer to said electric circuit.

15. A wheel motor as claimed in claim 7, wherein said wall cooperates with said second casing and said partition member to define therebetween a first space having a horseshoe-shaped configuration as said space, and a second space located inside said first space, said second space accommodating said output shaft and said gear reducer.

16. A wheel motor as claimed in claim 10, wherein said wall cooperates with said second casing and said partition member to define therebetween a first space having a horseshoe-shaped configuration as said space, and a second space located inside said first space, said second space accommodating said output shaft and said gear reducer.

* * * * *